(No Model.)
J. N. BROWN.
REACH CONNECTION FOR VEHICLES.
No. 395,610. Patented Jan. 1, 1889.
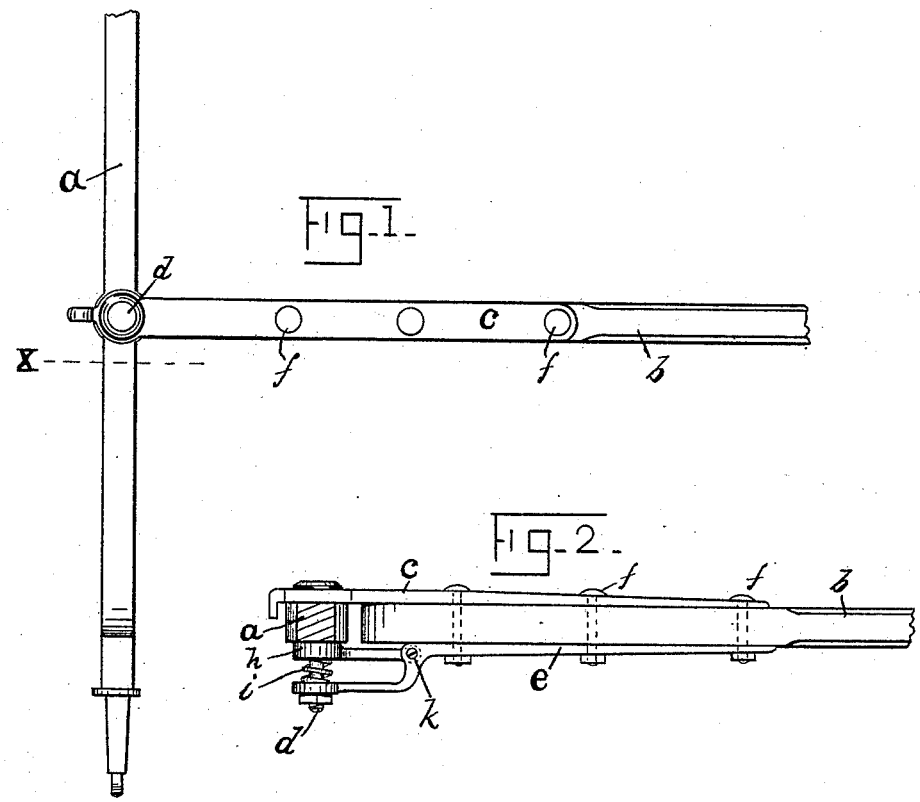
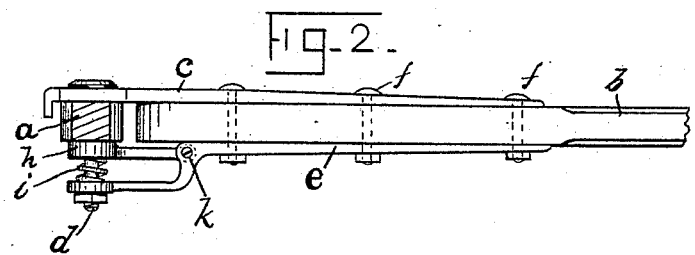
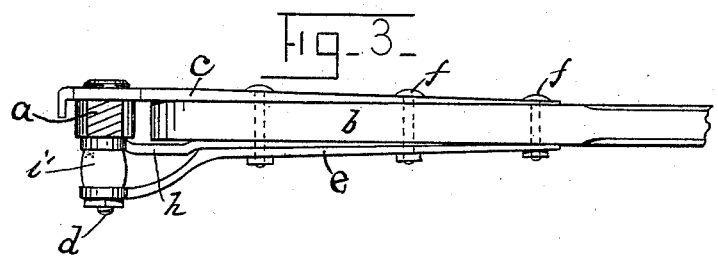
Witnesses.
Henry H. Burnham.
Allen Tenny.
Inventor
John N. Brown
By his Attorney
Frank H. Allen

UNITED STATES PATENT OFFICE.

JOHN N. BROWN, OF NEW LONDON, CONNECTICUT.

REACH-CONNECTION FOR VEHICLES.

SPECIFICATION forming part of Letters Patent No. 395,610, dated January 1, 1889.

Application filed March 17, 1888. Serial No. 267,447. (No model.)

*To all whom it may concern:*

Be it known that I, JOHN N. BROWN, a citizen of the United States, residing in the city and county of New London and State of Connecticut, have invented a certain new and useful Improvement in Reach-Connections for Vehicles, which improvement is fully set forth and described in the following specification, reference being had to the accompanying sheet of drawings, in which—

Figure 1 is a top view of a front axle with the reach secured thereto by my new connection. Fig. 2 is a cross-section of the same on line X, and Fig. 3 a similar view showing a modification of my invention.

My said invention is especially suitable for use with the so-called "cranked" axles now so commonly used, and seeks to provide a device for connecting the axle and reach in such manner that the wear of the connecting parts shall be taken up automatically.

In carrying my invention into effect I have also kept in mind the desirable elements of cheapness and strength.

Referring to the drawings, the letter $a$ indicates the axle and $b$ the reach. On the upper side of said reach is a plate or bar, $c$, having its end projecting outward over the axle, and either drilled to receive the king-bolt $d$ or having said king-bolt formed integral therewith.

On the under side of the reach is an arm, $e$, which is cranked and depressed near the reach end, and is also perforated to receive the king-bolt. The arms $c$ $e$ are secured rigidly to the reach by bolts $f$, passing through said parts, as plainly shown in Figs. 2 and 3.

Between the arm $e$ and the axle is a third arm, $h$, whose free end serves as a washer and is held firmly against the axle by a spring, $i$. Arm $h$ may be hinged to the fixed arm $e$, as at $k$, Fig. 2, or may have a taper shank, as in Fig. 3, which is clamped between said arm $e$ and the reach. In either case the washer-arm may be made of soft (non-elastic) metal of sufficient size and strength to support the washer end, the only office of the hinged or fixed arm being to prevent the portion that engages the axle from turning with said axle when in use.

A block of rubber, $i'$, could be used with good result in place of the spiral spring $i$, but the latter would wear longer and be quite as cheap to produce, therefore I prefer to use such a spring. With the construction described the spring acts to take up all wear, prevents all tendency to rattle, and costs but a little more than the common forked connection.

I claim as my invention—

In combination with an axle and reach, an upper and lower plate secured to said reach and projecting outward to the axle, as set forth, an intervening washer-arm engaging the axle, a king-bolt passing through said upper, lower, and washer plates and the axle, and a spring located between the free ends of the said lower and washer plates, substantially as described, and for the purpose specified.

JOHN N. BROWN.

Witnesses:
FRANK H. ALLEN,
JAMES KEEGAN.